US012562988B2

(12) United States Patent
Shashidhar et al.

(10) Patent No.: US 12,562,988 B2
(45) Date of Patent: Feb. 24, 2026

(54) BUM TRAFFIC HANDLING FOR EVPN E-TREE VIA NETWORK CONVERGENCE

(71) Applicant: Arista Networks, Inc., Santa Clara, CA (US)

(72) Inventors: Akhil Shashidhar, Cedar Park, TX (US); Aaron David Bamberger, Austin, TX (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/592,218

(22) Filed: Feb. 29, 2024

(65) Prior Publication Data

US 2024/0364615 A1     Oct. 31, 2024

Related U.S. Application Data

(60) Provisional application No. 63/499,069, filed on Apr. 28, 2023.

(51) Int. Cl.
| | |
|---|---|
| *H04L 45/76* | (2022.01) |
| *H04L 12/46* | (2006.01) |
| *H04L 45/02* | (2022.01) |
| *H04L 45/745* | (2022.01) |

(52) U.S. Cl.
CPC .......... *H04L 45/76* (2022.05); *H04L 12/4641* (2013.01); *H04L 12/4675* (2013.01); *H04L 45/04* (2013.01); *H04L 45/745* (2013.01)

(58) Field of Classification Search
None
See application file for complete search history.

(56) References Cited

U.S. PATENT DOCUMENTS

2024/0356838 A1* 10/2024 Sajassi ................... H04L 45/32

FOREIGN PATENT DOCUMENTS

CN          114430393 B  * 12/2022  ............. H04L 45/50

OTHER PUBLICATIONS

Bamberger et al. IMET Route Filtering for Ethernet VPN (EVPN) Ethernet Tree (E-Tree) with VXLAN Encapsulation. https://www.ietf.org/archive/id/draft-bamberger-bess-imet-filter-evpn-etree-vxlan-00.html. Published Mar. 1, 2023. 10 pages (Year: 2023).*
Sajassi et al. "Ethernet-Tree (E-Tree) Support in Ethernet VPN (EVPN) and Provider Backbone Bridging EVPN (PBB-EVPN)". https://www.ietf.org/archive/id/draft-sajassi-bess-rfc8317bis-00.txt. Published Apr. 30, 2023.*
A. Sajassi, et al., Ethernet-Tree (E-Tree) Support in Ethernet VPN (EVPN) and Provider Backbone Bridging EVPN (PBB-EVPN), Internet Engineering Task Force (IETF), Jan. 2018, pp. 1-23.

* cited by examiner

*Primary Examiner* — Jeffrey R Swearingen
(74) *Attorney, Agent, or Firm* — Treyz Law Group, P.C.; Tianyi He

(57)          ABSTRACT

An EVPN device may convey broadcast, unknown unicast, or multicast (BUM) traffic to one or more peer EVPN devices. Leaf-sourced BUM traffic may be dropped. After the network configuration for (known) unicast traffic has resolved, unicast versions of the BUM traffic may be appropriately forwarded to provide EVPN E-Tree service.

20 Claims, 9 Drawing Sheets

NETWORK DEVICE — 10E

CONTROL CIRCUITRY — 26

PROCESSING CIRCUITRY (E.G., ONE OR MORE PROCESSORS) — 28

EVPN E-TREE PROCESS — 36

MEMORY CIRCUITRY — 30

PACKET PROCESSOR(S) — 32

INPUT-OUTPUT INTERFACE(S) — 34

DROP ALL BUM TRAFFIC THAT IS POTENTIALLY IMPROPER PER EVPN E-TREE SEGMENTATION RULES — 40

CONFIGURE NETWORK DEVICE FOR KNOWN UNICAST TRAFFIC HANDLING — 42

FORWARD A UNICAST VERSION OF THE BUM TRAFFIC BASED ON KNOWN UNICAST TRAFFIC HANDLING — 44

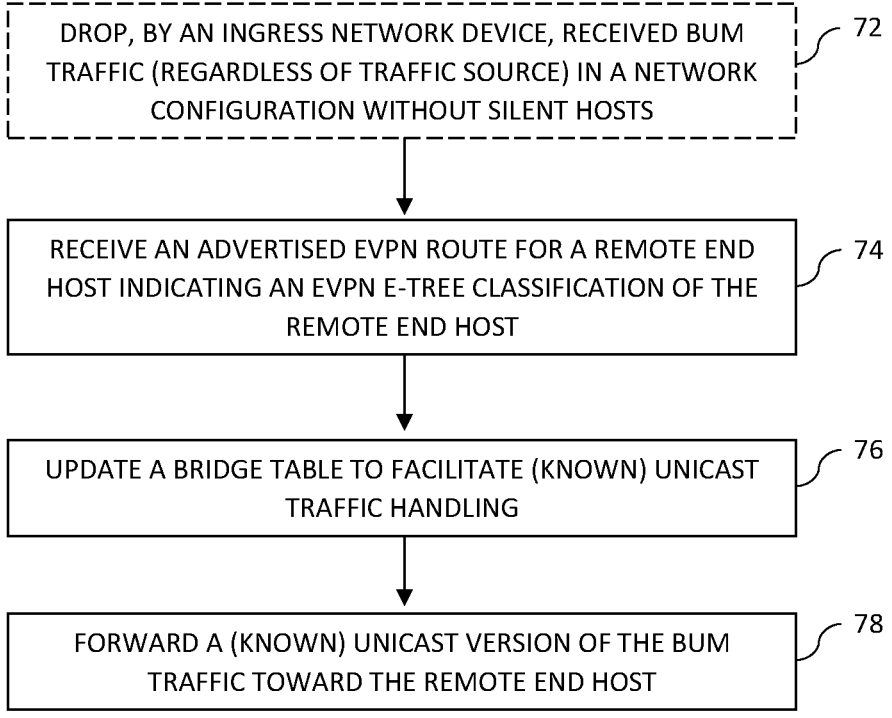

DROP, BY AN INGRESS NETWORK DEVICE, RECEIVED BUM TRAFFIC (REGARDLESS OF TRAFFIC SOURCE) IN A NETWORK CONFIGURATION WITHOUT SILENT HOSTS — 72

RECEIVE AN ADVERTISED EVPN ROUTE FOR A REMOTE END HOST INDICATING AN EVPN E-TREE CLASSIFICATION OF THE REMOTE END HOST — 74

UPDATE A BRIDGE TABLE TO FACILITATE (KNOWN) UNICAST TRAFFIC HANDLING — 76

FORWARD A (KNOWN) UNICAST VERSION OF THE BUM TRAFFIC TOWARD THE REMOTE END HOST — 78

FIG. 9

BUM TRAFFIC HANDLING FOR EVPN E-TREE VIA NETWORK CONVERGENCE

This application claims the benefit of U.S. provisional application No. 63/499,069, filed Apr. 28, 2023, which is hereby incorporated by reference herein in its entirety.

BACKGROUND

This relates to network devices, and more particularly, to network devices that handle traffic for implementing EVPN E-Tree.

In providing EVPN E-Tree service, provider edge devices can each be attached to root-designated host(s) and/or leaf-designated host(s). Traffic from a root-designated host should be able to reach other root-designated hosts and leaf-designated hosts, whereas traffic from a leaf-designated host should be able to reach root-designated hosts but unable to reach other leaf-designated hosts.

BRIEF DESCRIPTION OF THE DRAWINGS

FIG. 9 is a flowchart of illustrative operations for operating an ingress edge network device to provide EVPN E-Tree service in accordance with some embodiments.

DETAILED DESCRIPTION

A network can convey network traffic (e.g., in the form of one or more packets, one or more frames, etc.) between hosts. To properly forward the network traffic, the network can include a number of network devices. Some of these network devices may implement an Ethernet Virtual Private Network (EVPN) process and may exchange address reachability information represented by EVPN route information with one another and process the exchanged information. These network devices are sometimes referred to herein as EVPN devices or EVPN peer network devices.

Configurations in which the exchange of EVPN route information (e.g., hardware address reachability information) occurs using Border Gateway Protocol (BGP), or more specifically Multiprotocol BGP (MP-BGP), and/or with Virtual Extensible Local Area Network (VXLAN) or Multiprotocol Label Switching (MPLS) technology (e.g., using VXLAN or MPLS network infrastructure) are sometimes described herein as illustrative examples. If desired, the exchange of hardware address reachability information can occur with other types of control plane routing protocol and utilize other types of underlying network infrastructure.

For some applications, it may be desirable to implement a network segmentation technology such as EVPN Ethernet-Tree (E-Tree) using EVPN devices. While satisfactory handling of (known) unicast traffic when providing EVPN E-Tree service may be relatively straightforward, handling of broadcast, unknown unicast, and/or multicast (BUM) traffic in an appropriate manner to provide proper EVPN E-Tree service may be more complex.

In some illustrative configurations described herein as examples, handling of BUM traffic may rely on the handling of a (known) unicast version of the BUM traffic to simplify enforcement of EVPN E-Tree segmentation rules. In these examples, all or at least a portion of potentially problematic BUM traffic may initially be dropped in favor of waiting for network convergence that facilitates appropriate handling of known unicast traffic and subsequently processing the known unicast version of the BUM traffic. In particular, the use of this technique in enforcing BUM traffic segmentation rules (essentially by relying on enforcement of known unicast traffic segmentation rules) may be particularly useful when BUM traffic flows are intended to ultimately be known unicast traffic flows (e.g., when a BUM traffic flow resolves to a known unicast traffic flow when the desired destination host is determined).

Figure 1:
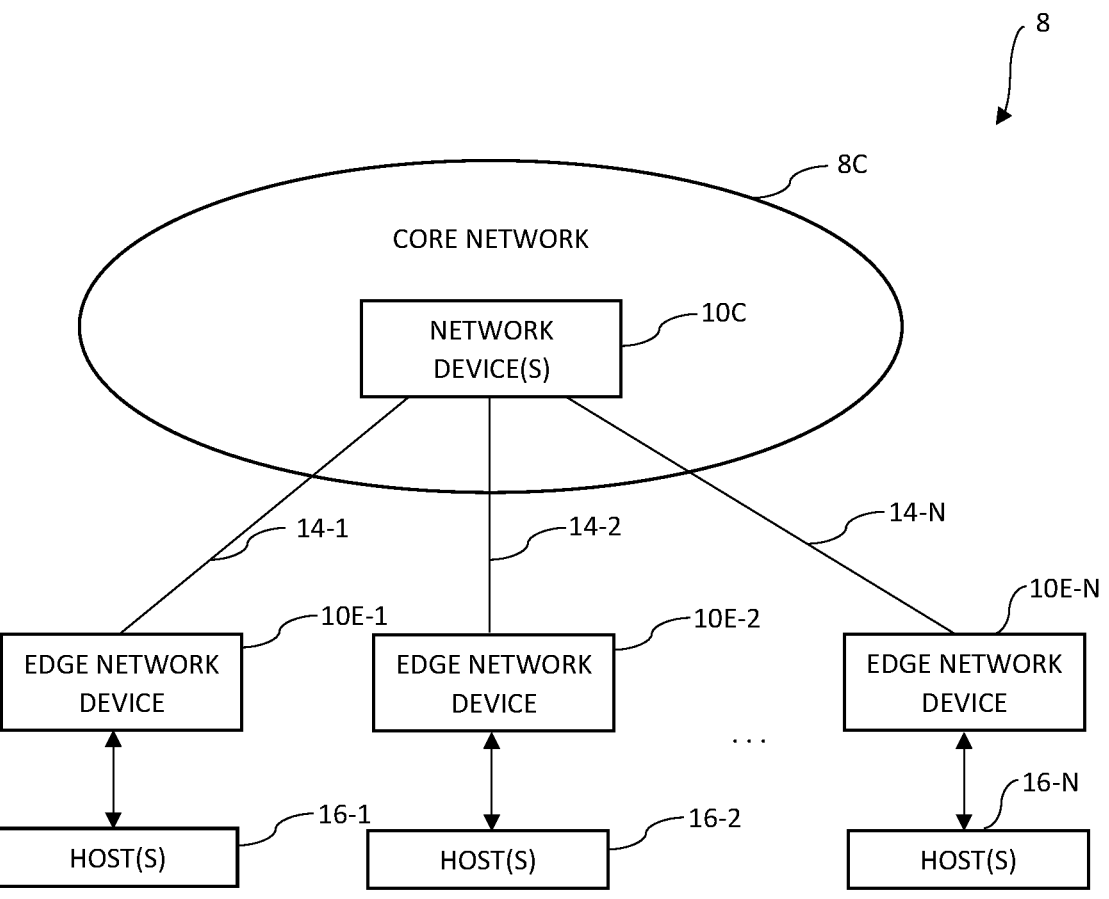
FIG. 1 is a diagram of an illustrative network having one or more edge network devices in accordance with some embodiments.

An illustrative networking system in which EVPN devices implement a network segmentation technology such as EVPN E-Tree is shown in FIG. 1. A network such as network 8 may be of any suitable scope and/or form part of a larger network of any suitable scope. As examples, network 8 may include, be, and/or form part of one or more local segments, one or more local subnets, one or more local area networks (LANs), one or more virtual local area networks (VLANs), one or more campus area networks, a wide area network, etc. Network 8 may include any suitable number of different network devices that connect corresponding host devices of network 8 to one another. If desired, network 8 may include or be coupled to internet service provider networks (e.g., providing connectivity for the Internet) or other public service provider networks, private service provider networks (e.g., multiprotocol label switching (MPLS) networks), and/or other types of networks such as telecommunication service provider networks (e.g., a cellular network).

As shown in FIG. 1, network 8 may include a core network or core network portion 8C interconnecting different edge networks or edge network portions (e.g., different sites and/or different domains). As one illustrative example, core network portion 8C may form a backbone network such as a service provider network (e.g., an Internet or Internet Protocol (IP) service provider network, a Multiprotocol Label Switching (MPLS) infrastructure network, a cloud provider network, or generally a communication network core). Core network portion 8C may connect different edge network portions belonging to entities (e.g., customers) different from (or the same as) those that provide core network portion 8C. In configurations in which network devices implement one or more EVPN instances over core network portion 8C, core network portion 8C may sometimes be referred to herein as an EVPN core or generally an underlay network.

Core network devices 10C may sometimes be referred to as provider (network) core devices whereas edge network devices 10E may sometimes be referred to as provider (network) edge devices. Core network portion 8C may include core network devices 10C that are interconnected with each other within core portion 8C. Network paths 14 (e.g., one or more paths 14-1, one or more paths 14-2, . . . , one or more paths 14-N) couple one or more core network devices 10C to edge network devices 10E (e.g., devices 10E-1, 10E-2, . . . , 10E-N) that serve as interfaces between the core network devices 10C and the edge network portions. These edge network portions (e.g., sites) may each include its own set of hosts 16 (e.g., hosts 16-1, 16-2, . . . , 16-N) and its own set of network devices (not explicitly shown in FIG. 1) between host(s) 16 and a corresponding edge network device 10E.

Network devices in network 8 such as provider edge network devices 10E, provider core network devices 10C, and network devices in the edge network portions may each include or be a switch (e.g., a single-layer (Layer 2) switch or a multi-layer (Layer 2 and Layer 3) switch), a bridge, a router, a gateway, a hub, a repeater, a firewall, a wireless access point, a network device serving other networking functions, a network device that includes the functionality of two or more of these devices, a management device that controls the operation of one or more of these network devices, and/or other types of network devices. Configurations in which provider edge network devices 10E-1, 10E-2, . . . , 10E-N are (multi-layer) switches, routers, gateways, or network devices that generally include routing functionalities (e.g., implements routing protocols) are described herein as an example.

Hosts 16 may be implemented on host devices or host equipment. Some hosts may be implemented on a shared host device or shared host equipment, while other hosts may each be implemented on a separate host device or a separate piece of host equipment. Different host devices or host equipment in network 8 (e.g., hosts in the edge network portions or sites) serving as end hosts of network 8 may each include or be a computer, a server or server equipment, a portable electronic device such as a cellular telephone, a laptop, etc., a network traffic storage device, a networking service device, network management equipment that manages and controls the operation of one or more of hosts and/or network devices, and/or any other suitable types of specialized or general-purpose host computing equipment, e.g., running one or more client-side and/or server-side applications.

Networking equipment (e.g., network devices and devices or equipment on which hosts are implemented) in network 8 may be connected by one or more wired technologies or standards such as Ethernet (e.g., using copper cables and/or fiber optic cables), thereby forming a wired network portion of network 8 (e.g., including core network portion 8C and portions of edge network portions). If desired, network 8 may also include one or more wireless network portions (e.g., implemented using wireless access points) that extend from the wired network portion.

In some configurations described herein as an example, edge network devices 10E may implement an EVPN over core network 8C, and accordingly, may be referred to as EVPN peer devices with respect to each other. In these illustrative configurations, the EVPN peer devices may exchange EVPN route information (e.g., hardware address reachability information) with one another over core network 8C. The EVPN route information (e.g., BGP messages containing the EVPN route information) may be exchanged based on any suitable underlying (transport layer and internet layer) protocol(s) that facilitate communication across underlay network 8C. The core or underlay network 8C (and the devices herein) may provide and implement underlying infrastructure over which the overlay VXLAN-based and/or MPLS-based network is implemented.

Figure 2:
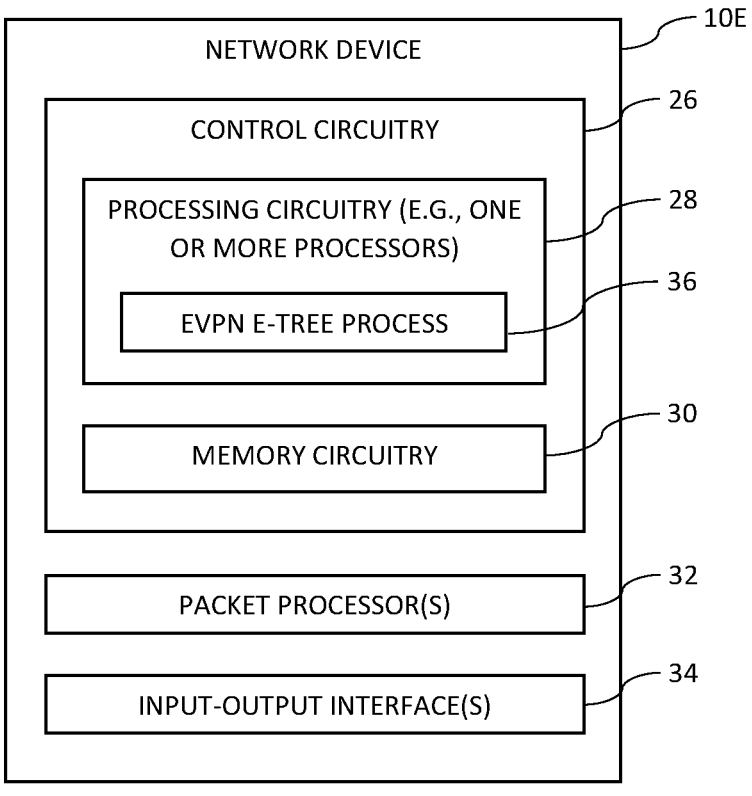
FIG. 2 is a diagram of an illustrative network device in accordance with some embodiments.

FIG. 2 is a diagram of an illustrative EVPN device such as network device 10E (e.g., any of edge network devices 10E-1, 10E-2, . . . , 10E-N) configured to exchange EVPN routes (e.g., in the form of EVPN route information within BGP messages) with other EVPN peer devices. If desired, other network devices such as network devices 10C (FIG. 1), (customer) site edge devices, gateways for sites, spine switches for sites, leaf switches for sites, and/or other network devices connected to the edge network devices may have at least some (e.g., all) of the same components as the network device depicted in FIG. 2 but may omit execution of a EVPN process and/or a network segmentation technology process, such as a EVPN E-Tree process, at the processing circuitry.

As shown in FIG. 2, network device 10E may include control circuitry 26 having processing circuitry 28 and memory circuitry 30, one or more packet processors 32, and input-output interfaces 34 disposed within a housing of network device 10E. In one illustrative arrangement, network device 10E may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10E may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array (FPGA) device, based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer-readable storage media that stores the operating system software and/or any other software code, sometimes referred to as program instructions, software, data, instructions, or code. As an example, the EVPN routing functions performed by network device 10E described herein may be stored as (software) instructions on the non-transitory computer-readable storage media (e.g., in portion(s) of memory circuitry 30 in network device 10E). The corresponding processing circuitry (e.g., one or more processors of processing circuitry 28 in network device 10E) may process or execute the respective instructions to perform the corresponding EVPN routing functions. Memory circuitry 30 may be implemented using non-volatile memory (e.g., flash memory or other electrically-programmable read-only memory configured to form a solidstate drive), volatile memory (e.g., static or dynamic random-access memory), hard disk drive storage, removable storage devices (e.g., storage device removably coupled to device 10E), and/or other storage circuitry. Processing circuitry 28 and memory circuitry 30 as described above may sometimes be referred to collectively as control circuitry 26 (e.g., implementing a control plane of network device 10E).

As just a few examples, processing circuitry 28 may execute network device control plane software such as operating system software, routing policy management software, routing protocol agents or processes (e.g., EVPN and E-Tree service process 36), routing information base agents, and other control software, may be used to support the operation of protocol clients and/or servers (e.g., to form some or all of a communications protocol stack), may be used to support the operation of packet processor(s) 32, may store packet forwarding information, may execute packet processing software, and/or may execute other software instructions that control the functions of network device 10E and the other components therein.

Packet processor(s) 32 may be used to implement a data plane or forwarding plane of network device 10E. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array (FPGA) device, based on application specific system processors (ASSPs), based on application specific integrated circuit (ASIC) processors, and/or based on other processor architectures.

A packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., implemented over one or more Ethernet ports), optical interfaces, wireless interfaces such as Bluetooth interfaces and Wi-Fi interfaces, and/or other communication interfaces for connecting network device 10E to the Internet, a local area network, a wide area network, a mobile network, and/or generally other network device(s), peripheral devices, and computing equipment (e.g., host equipment such as server equipment, client devices, etc.). As an example, input-output interfaces 34 may be implemented using and therefore include ports to which corresponding mating connectors of external components can be physically coupled and electrically connected. Ports may have different form-factors to accommodate different cables, different modules, different devices, or generally different external equipment. If desired, input-output interfaces 34 (e.g., wireless interfaces) may be implemented using and therefore include wireless communication circuitry (e.g., antennas, transceivers, radios, etc.).

Configurations in which some network devices in network 8 (e.g., edge network devices 10E in FIGS. 1 and 2) provide an EVPN and a network segmentation service such as an E-Tree service over the EVPN (e.g., using processes 36 executing on corresponding processing circuitry of respective EVPN devices) are sometimes described herein as an illustrative example. EVPN process 36 may manage and facilitate operations for an EVPN such as the exchange of EVPN routes (e.g., route information contained in advertised BGP messages) with other peer devices and the handling and processing of the exchanged information. The E-Tree service portion of process 36 may help implement a network segmentation service by determining the EVPN E-Tree classification (e.g., a leaf classification or a root classification) of local hosts and/or remote hosts and processing traffic between local and remote hosts of different role classifications based on EVPN E-Tree segmentation rules.

Based on EVPN E-Tree segmentations rules for a given VLAN or VLAN bundle, root-sourced or root-originated traffic (e.g., traffic from an end host designated with a root classification) should be allowed to be received by both end hosts designated with a root classification and end hosts designated with a leaf classification, whereas leaf-sourced or leaf-originated traffic (e.g., traffic from an end host designated with a leaf classification) may be allowed to be received by end hosts designated with a root classification but may not be allowed to be received by end hosts designated a leaf classification.

Consider an example in which an ingress edge network device 10E (e.g., a network device on the ingress side of core network 8C that transmits traffic into the core network) receives unicast traffic from a locally attached end host for conveyance to a remote end host via core network 8C and via an egress edge network device 10E (e.g., another network device on the egress side of core network 8C that received traffic from the core network). In this example, the ingress edge network device may determine that the (root or leaf) classification of the local end host based on local configuration and, based on a bridge table that includes an entry associated with the remote end host and its classification, determine how to forward (e.g., whether or not to forward) the known unicast traffic toward the remote end host. Because this type of determination and traffic filtering occur on the ingress edge network device, this operation may sometimes be referred to as ingress filtering.

Consider another example in which an ingress edge network device 10E receives BUM traffic from a locally attached end host for conveyance to multiple remote end hosts via core network 8C and via one or more egress edge network devices 10E. In this example, the ingress edge network device may replicate the received BUM traffic (sometimes referred to as ingress replication) for conveyance to the one or more egress edge network devices 10E over core network 8C such that each egress edge network device 10E can make a determination on how to forward (e.g., whether or not to forward) to end hosts locally attached to that egress edge network device 10E. Because this type of determination and traffic filtering occur on the egress edge network device, this operation may sometimes be referred to as egress filtering.

In some network configurations, the BUM traffic received at an egress edge network device may not necessarily contain any indication of the classification of the traffic-originating end host that is interpretable by the egress edge network device. In other words, the egress edge network device may be unable to determine whether or not the BUM traffic is leaf-sourced or root-sourced. Accordingly, the egress edge network device may be unable to perform appropriate egress filtering to guarantee EVPN E-Tree segmentation.

Figure 3:
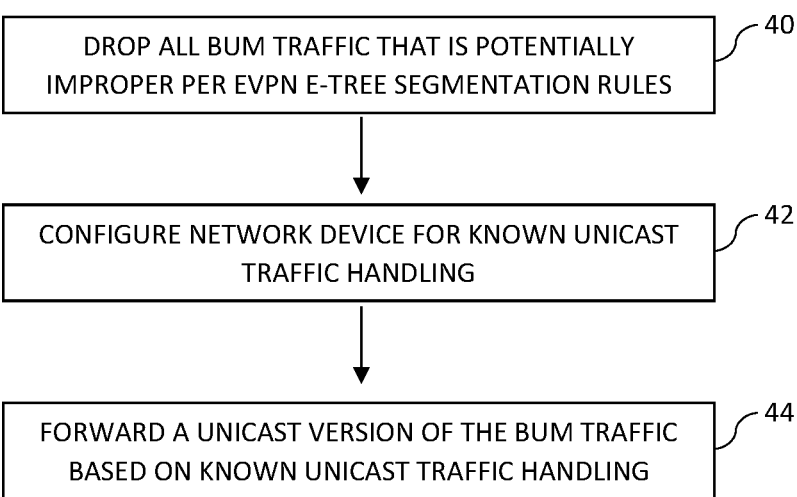
FIG. 3 is a flowchart of illustrative operations for indirectly handling BUM traffic using network convergence for unicast traffic handling in accordance with some embodiments.

To mitigate these issues, the network devices 10E (e.g., devices 10E-1, 10E-2, . . . , 10E-N in FIG. 1) may be configured to perform the operations described in connection with FIG. 3. In particular, one or more network devices 10E may be configured to drop all BUM traffic that is potentially improper per EVPN E-Tree segmentation rules (at block 40). One or more network devices may subsequently be configured to handle known unicast traffic (block 42). In some scenarios described herein as an example, BUM traffic are usually intended to be conveyed eventually as and/or be obviated by corresponding known unicast traffic. As such, the one or more network devices may be configured to forward a known unicast version of the originally dropped BUM traffic based on known unicast traffic handling.

Figure 4:
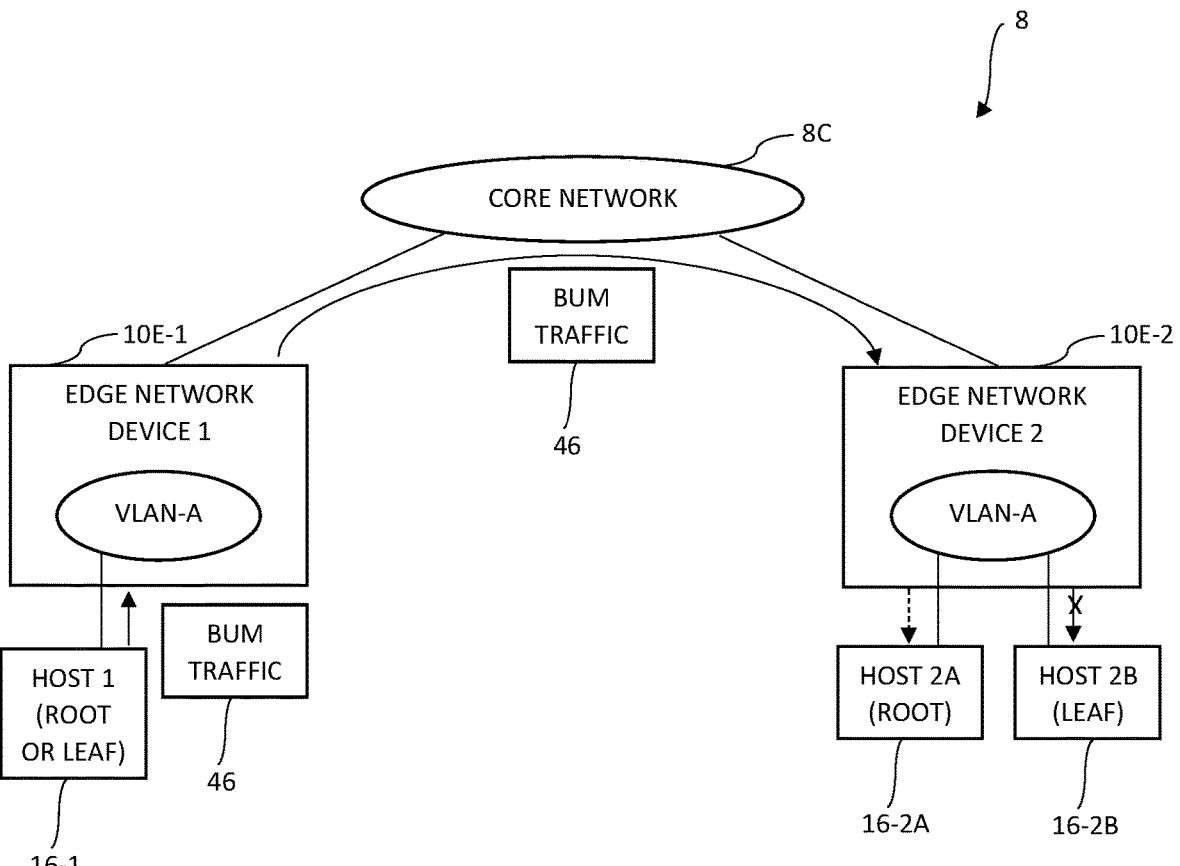
FIG. 4 is a diagram of an illustrative network configuration with an egress edge network device configured to drop at least a portion of BUM traffic in accordance with some embodiments.

FIG. 4 shows an illustrative network configuration having network devices 10E-1 and 10E-2 (e.g., two of network devices 10E in FIGS. 1 and 2) configured to provide EVPN E-Tree service (e.g., in the manner described in connection with FIG. 3). In particular, edge network devices 10E-1 and 10E-2 may each execute an EVPN E-tree service process 36 (e.g., executing on respective processing circuitry 28 of devices 10E-1 and 10E-2).

Edge devices 10E-1 and 10E-2 may provide one or more EVPN instances that are attached to (e.g., communicatively coupled to) root-designated hosts and/or leaf-designated hosts. Each EVPN instance can contain one or more Layer 2 (L2) broadcast domains (e.g., VLANs). Leaf or root designations (sometimes referred to as EVPN E-Tree classifications) may be provided on a per (provider) edge device basis, may be provided on a per attachment circuit (e.g., per VLAN) basis, and/or may be provided on a per host (e.g., per Media Access Control (MAC) address) basis. Configurations in which leaf or root designations are provided on a per host basis are sometimes described herein as illustrative examples. In these examples, hosts of different designations (e.g., both leaf hosts and root hosts) may belong to the same VLAN and may be coupled to the same edge device.

In the example of FIG. 4, edge devices 10E-1 and 10E-2 are configured to implement an illustrative EVPN instance such as an EVPN instance based on a VLAN based service for a VLAN (e.g., a VLAN identified by VLAN identifier VLAN-A). To implement the EVPN instance, edge network device 10E-1 may be coupled to a first site containing one or more end hosts such as host 16-1 on (e.g., as a member of, belonging to, etc.) the VLAN identified by VLAN-A. End host 16-1 may be designated and identified by local configuration at device 10E-1 as a root host (in a first scenario) or a leaf host (in a second scenario). Edge network device 10E-2 may be coupled to a second site containing one or more end hosts such as hosts 16-2A and 16-2B on (e.g., as members of, belonging to, etc.) the VLAN identified by VLAN-A. End host 16-2A may be designated and identified by local configuration at device 10E-2 as a root host and end host 16-B may be designated and identified by local configuration at device 10E-2 as a leaf host.

While the sites coupled to or locally attached to edge network devices 10E-1 and 10E-2 are shown in FIG. 4 to contain only a few hosts, this is merely illustrative. If desired, these sites may include network devices (e.g., gateways, routers, switches, and/or other suitable types of network devices) coupled between the edge devices and the corresponding hosts and/or may include additional (root and/or leaf) hosts. While the example of FIG. 4 illustrates a network configuration in which the EVPN instance is provided for a given VLAN, this is merely illustrative. If desired, one or more EVPN instances may be provided for other VLANs or for VLAN bundles (e.g., a VLAN-aware bundle containing multiple VLANs).

Edge network devices 10E-1 and 10E-2 may be configured to enforce appropriate EVPN E-Tree segmentation based on leaf and root designations for end hosts. Each edge network device 10E may advertise EVPN routes in messages (e.g., BGP messages) conveyed through core network 8C to the other peer edge devices 10E. Each edge network device 10E may receive and process these advertised EVPN routes from the other peer edge network devices 10E to determine the designation of remote hosts and thereby enforce appropriate segmentation (e.g., by appropriately forwarding and dropping traffic) based on the root and leaf designations.

Edge network devices 10E-1 and 10E-2 may be configured to handle BUM (broadcast, unknown unicast, and/or multicast) traffic by performing the operations described in connection with FIG. 3. In the example of FIG. 4, illustrative network traffic such as BUM traffic 46 may be forwarded between peer edge network devices 10E-1 and 10E-2 via core network 8C.

BUM traffic 46 may originate (e.g., be sourced) from host 16-1. After receiving BUM traffic 46 from locally attached host 16-1, ingress edge network device 10E-1 may perform ingress replication to send BUM traffic 46 across core network 8C such that egress edge network devices such as device 10E-2 may receive the BUM traffic 46.

BUM traffic 46 may lack any indication of the EVPN E-Tree classification of its source end host. As examples, a leaf-indication flag, a leaf-indication label, a leaf-indicating network identifier (e.g., a leaf-specific VXLAN network identifier), and/or other leaf (or root) indication information may be absent from the header of BUM traffic 46. In the absence of such information from the received BUM traffic and/or generally when egress edge network device 10E-2 is unable to determine the EVPN E-Tree classification of the source of BUM Traffic 46, device 10E-2 may drop (e.g., not forward) any BUM traffic that is potentially problematic (e.g., any portion of received BUM traffic 46 that, if forwarded, would not abide by the EVPN E-Tree segmentation rules).

In the example of FIG. 4, BUM traffic 46 may be originally destined for both end host 16-2A and 16-2B. However, device 10E-2 may drop BUM traffic 46 to prevent end host 16-2B from receiving BUM traffic 46 because device 10E-2 may be unable to determine whether source of BUM traffic 46 is a leaf-designated end host or a root-designated end host. If the source of BUM traffic 46 is a leaf-designated end host, forwarding to leaf-designated end host 16-2B should not be allowed based on EVPN E-Tree segmentation.

In one illustrative configuration for device 10E-2, device 10E-2 may also drop BUM traffic 46 to prevent end host 16-2A (in addition to host 16-2B) from receiving BUM traffic 46 and/or may generally drop BUM traffic 46 to prevent all locally attached end hosts from receiving BUM traffic 46. However, this may not be necessary.

While device 10E-2 may be unable to determine whether the source of BUM traffic 46 is a leaf-designated end host or a root-designated end host, determination of the classification of the source end host of BUM traffic 46 may not be necessary when the destination end host is a root-designated end host because both leaf-sourced and root-sourced traffic can be received by root-designated end hosts such as end host 16-2A locally attached to device 10E-2. As such, in another illustrative configuration for device 10E-2, device 10E-2 may drop BUM traffic 46 to prevent end host 16-2B from receiving BUM traffic 46 but may forward BUM traffic 46 to end host 16-2A (and/or any other root-designated locally attached end hosts on the same VLAN).

Based on the operation described in connection with FIG. 4, some potentially allowable traffic flows may be blocked or dropped by device 10E-2. In particular, in the scenario in which end host 16-1 is a root-designated host and BUM traffic 46 is root-sourced, device 10E-2 may drop BUM traffic 46 to prevent leaf-designated host 16-2B from receiving BUM traffic 46 even though forwarding of root-sourced BUM traffic 46 to leaf-designated end host 16-2B is allowable per EVPN E-Tree segmentation. However, doing so guarantees that in a scenario in which BUM traffic 46 is leaf-sourced (e.g., in the alternative scenario in which originating host 16-1 is leaf-designated), device 10E-2 does not violate EVPN E-Tree segmentation rules.

In illustrative network configurations described herein as an example, the conveyance of BUM traffic such as BUM traffic 46 may represent a transient state of the network. In other words, BUM traffic 46 may ultimately be intended to be transmitted as known unicast traffic. As an example, when BUM traffic 46 is unknown unicast traffic, once all remote end hosts are learned, all such unknown unicast traffic may be resolved using known unicast traffic. As another example, when BUM traffic 46 is broadcast traffic, the broadcast traffic (e.g., Address Resolution Protocol (ARP) broadcast messages) may be unnecessary once all remote end hosts are learned. Accordingly, the BUM traffic tends to be resolvable as unicast versions of the BUM traffic over time.

Figure 5:
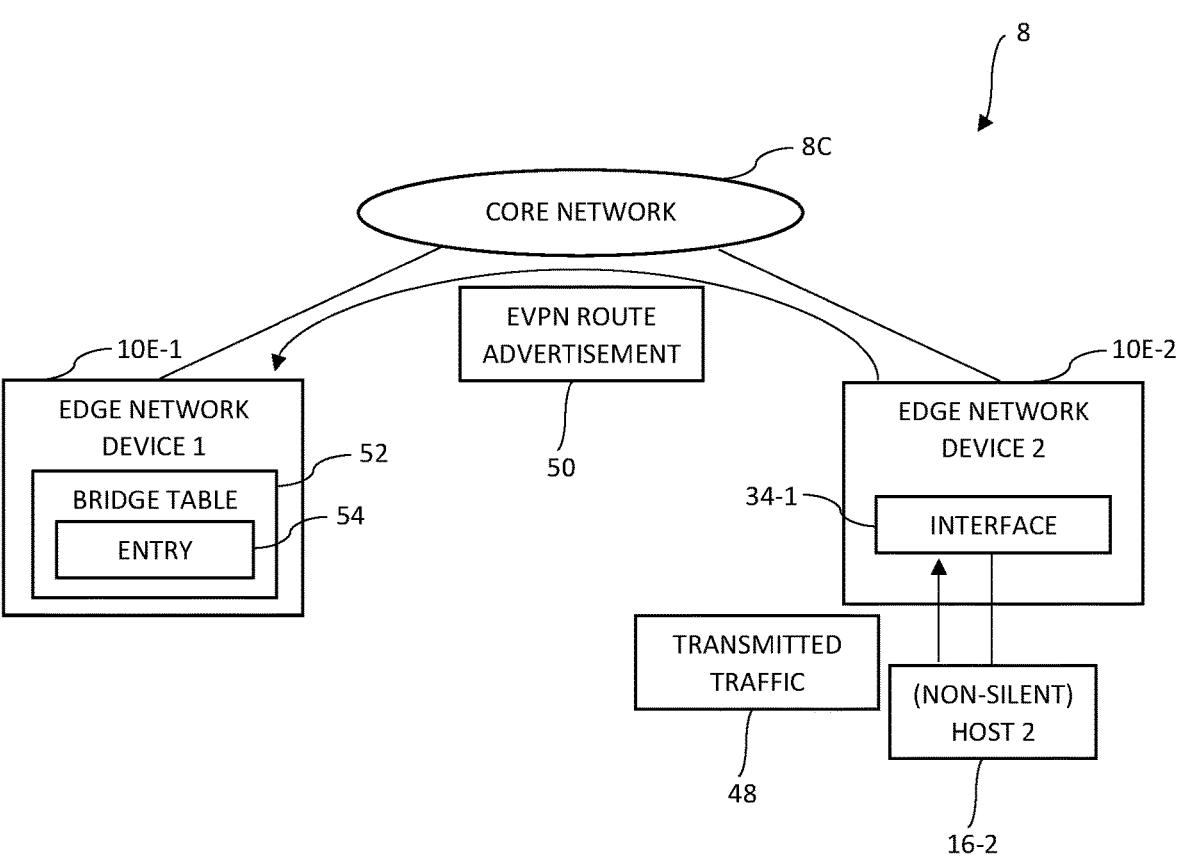
FIG. 5 is a diagram of an illustrative network configuration with an egress edge network device advertising an EVPN route to configure an ingress edge network device for unicast traffic handling in accordance with some embodiments.

To converge the network configuration and facilitate unicast traffic handling, edge network devices 10E may each receive traffic transmitted by its locally attached end hosts and may advertise reachability of the locally attached end hosts to remote peer edge network devices. FIG. 5 is a diagram of an illustrative edge network device configured to advertise EVPN route information.

As shown in FIG. 5, device 10E-2 (e.g., egress edge network device 10E-2 in the example of FIG. 4), may receive traffic 48 transmitted by end host 16-2 (e.g., one of hosts 16-2A and 16-2B in FIG. 4). End hosts such as end host 16-2 that regularly transmits traffic during their operations are sometimes referred to herein as non-silent or transmitting end hosts. Responsive to device 10E-2 receiving traffic 48 from end host 16-2 at given interface 34-1 implemented on a corresponding device port, device 10E-2 may associate end host 16-2 (e.g., a Media Access Control (MAC) address of end host 16-2) to interface 34-1 and store the MAC address of host 16-2 associated with interface 34-1. Based on local configuration for interface 34-1 stored on device 10E-2, device 10E-2 may determine the EVPN E-Tree classification of end host 16-2 (e.g., whether end host 16-2 is a root-designated host or a leaf-designated host).

EVPN device 10E-2 may subsequently advertise reachability information for host 16-2 attached at interface 34-1 to other peer EVPN devices such as EVPN device 10E-1. In the example of FIG. 5, device 10E-2 may advertise an EVPN route in advertisement message 50 (e.g., a BGP message containing the EVPN route information). Message 50 may include an EVPN Type-2 route (sometimes referred to herein as an EVPN MAC/IP advertisement route). In general, the EVPN Type-2 route may include a route distinguisher, an Ethernet segment identifier, an Ethernet tag identifier, a MAC address, and an Internet Protocol (IP) address, among other fields, e.g., specified in Request for Comments (RFC) 7432. Using message 50, device 10E-2 may advertise the reachability of host 16-2 via interface 34-1 at device 10E-2.

Additionally, message 50 may optionally include an E-Tree extended community attached to the advertised EVPN route. In scenarios in which host 16-2 is a leaf-designated host, the EVPN route in message 50 advertised for host 16-2 (e.g., including the MAC address of host 16-2) may be attached with a E-Tree extended community containing leaf-indication information (e.g., a leaf-indication flag or label). In scenarios in which host 16-2 in a root-designated host, the E-Tree extended community may be omitted and absent from the EVPN route in message 50 advertised for host 16-2 (or other root-indication information may be contained herein).

Upon receiving message 50 over core network 8C, peer EVPN device 10E-1 (e.g., ingress edge network device 10E-1 in the example of FIG. 4) may process message 50 (e.g., process the EVPN route and, if present, the attached leaf-indication information). In particular, after processing the received EVPN route, device 10E-1 may store reachability information (e.g., interface 34-1 at device 10E-2) for remote end host 16-2 as an entry 54 in bridge table 52 for the VLAN associated with host 16-2. Entry 54 associated with end host 16-2 may also store an indication of EVPN E-Tree classification (e.g., leaf or root classification) of host 16-2. Accordingly, the advertisement of message 50, when received and processed by device 10E-1, may configure bridge table 54 to appropriately handle (bridge) known unicast traffic destined for host 16-2 when corresponding known unicast traffic is received from a local end host on the same VLAN.

In a manner analogous to that described for end host 16-2 in FIG. 5, end hosts locally attached to each edge network device 10E may be learned over time and advertised to other peer edge network devices such that the other peer edge network devices may learn of reachability of remote end hosts and EVPN E-Tree classifications of the remote end hosts to facilitate handling of unicast traffic in network 8.

Figure 6:
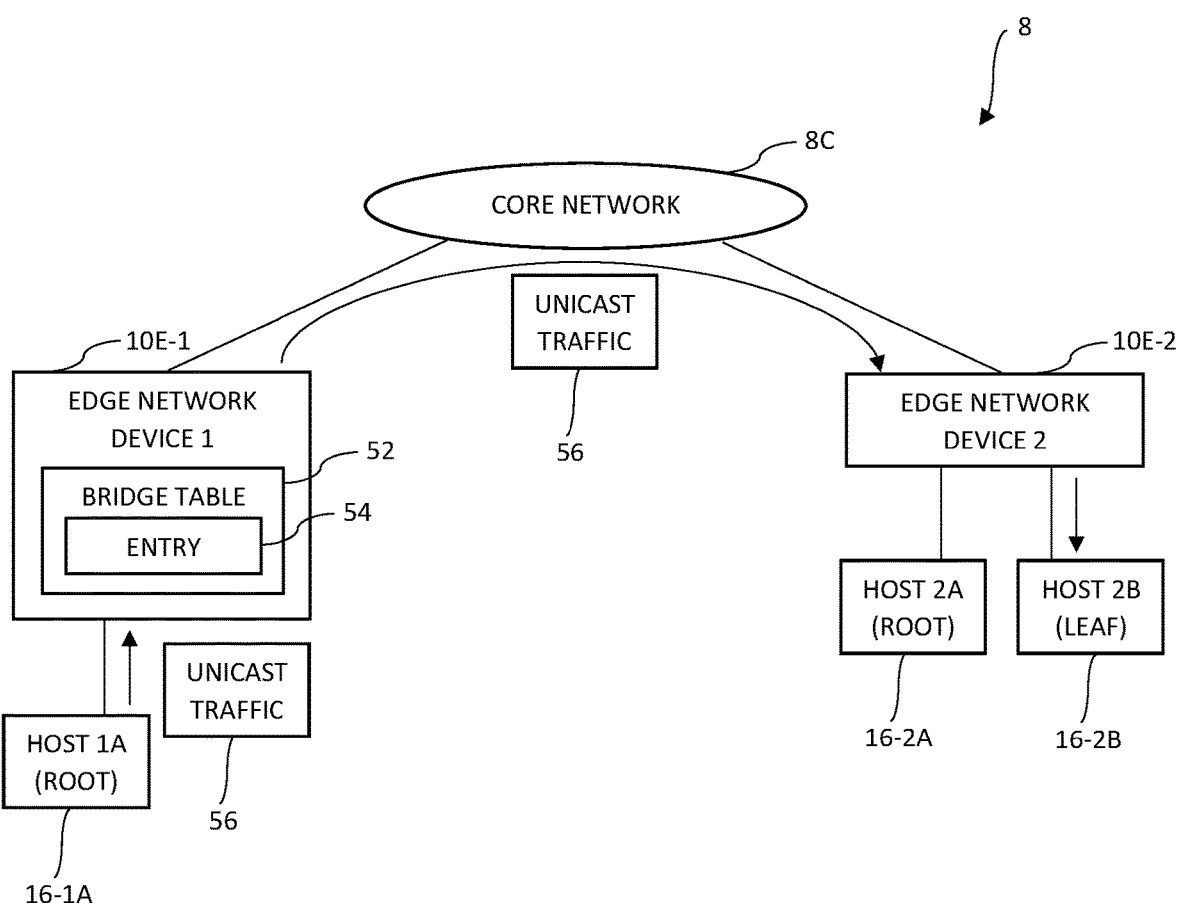
FIG. 6 is a diagram of an illustrative network configuration with an ingress edge network device forwarding a known unicast version of previously sent BUM traffic in accordance with some embodiments.

FIG. 6 is a diagram of illustrative handling of (known) unicast traffic. As an example, host 16-1A may transmit (known) unicast traffic 56. This known unicast traffic 56 may be a known unicast version of previously sent BUM traffic (e.g., re-transmission traffic based on not receiving an appropriate response from one or more remote hosts after sending BUM traffic 46 in FIG. 4). Upon receiving known unicast traffic 56, device 10E-1 may perform a lookup operation using bridge table 52 and more specifically entry 54 to appropriately process known unicast traffic 56 (e.g., to enforce EVPN E-Tree segmentation).

In the example of FIG. 6, host 16-1A locally attached to device 10E-1 may be a root-designated end host. Known unicast traffic 56 received from host 16-1A may be destined for remote end host 16-2B. Prior to device 10E-1 receiving traffic 56, device 10E-2 may have already advertised reachability information for leaf-designated host 16-2B in the manner described in connection with FIG. 5. More specifically, upon receiving traffic from host 16-2B (serving as non-silent host 16-2 in the example of FIG. 5) at a given interface, device 10E-2 may have advertised an EVPN route (e.g., an EVPN Type-2 route) with leaf-indication information (e.g., in an E-Tree extended community attached to the EVPN route) because host 16-2B is a leaf-designated host. Upon receiving the EVPN route (e.g., in the form of message 50 in FIG. 5), device 10E-1 may have updated bridge table 52 to include entry 54 containing the reachability information of end host 16-2B (e.g., at an interface of remote device 10E-2) and EVPN E-Tree classification of end host 16-2B.

After configuring bridge table 52 with reachability information and EVPN E-Tree classification of host 16-2B, device 10E-1 may use bridge table 52 to process (e.g., bridge) known unicast traffic 56 for conveyance to end host 16-2B. In particular, based on the EVPN E-Tree classification of remote destination end host 16-2B being leaf and known unicast traffic 56 being root-sourced (e.g., from local root-designated host 16-1), device 10E-1 may forward (e.g., bridge, encapsulate for transport, etc.) unicast traffic over core network 8C to device 10E-2. Upon receiving known unicast traffic 56, device 10E-2 may forward (e.g., decapsulate) known unicast traffic 56 toward host 16-2B via the advertised interface.

Traffic 56 may be a known unicast version of BUM traffic 46 in FIG. 4. As examples, traffic 56 may be a re-transmitted (known) unicast version of BUM traffic 46, may contain at least some of the same payload as BUM traffic 46, may perform the same function as BUM traffic 46 (except directed at a specific end host), etc. Accordingly, while BUM traffic 46 toward host 16-2B may be dropped in the example of FIG. 4, after network convergence for handling unicast traffic (e.g., as described in the example of FIG. 5), a known unicast version of the BUM traffic may be received by host 16-2B in the example of FIG. 6.

While the example of FIG. 5 illustrates how reachability of non-silent end hosts may be advertised to facilitate unicast traffic handling, network 8 (e.g., in some network arrangements) may include silent end hosts. These silent or non-transmitting end hosts may not transmit traffic during their operations (e.g., may be storage devices, listeners, sensors, etc., that only receive network traffic) and may therefore not be discoverable in the same manner described for non-silent end host 16-2 in FIG. 5. Accordingly, network convergence for unicast handling may be incomplete if edge network devices do not receive network traffic from these silent end hosts. For example, if end host 16-2B in FIG. 4 is a silent host, the transmission of traffic by host 16-2B to edge device 10E-2 and the subsequent advertisement of EVPN route for reachability of 16-2B (e.g., as described for host 16-2 in connection with FIG. 5) would not occur, and consequently, the forwarding of unicast traffic to host 16-2B (e.g., described in connection with FIG. 6) would not be possible (e.g., bridge table 52 would not be configured with reachability information of the silent host).

Figure 7:
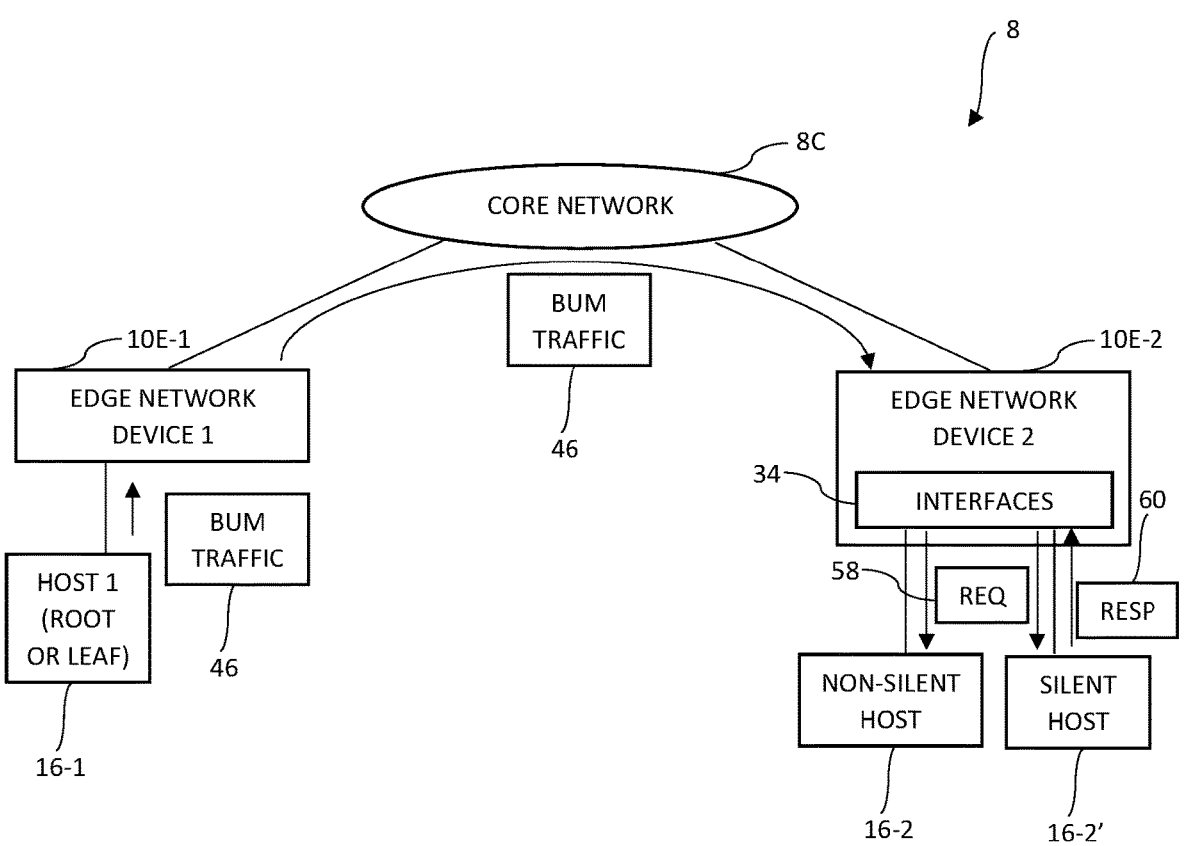
FIG. 7 is a diagram of an illustrative network configuration with an egress edge network device requesting a response from a locally attached silent host in accordance with some embodiments.

FIG. 7 is a diagram of an illustrative egress edge network device configured to solicit communication from a silent end host to facilitate advertisement of EVPN route information for the silent host.

As shown in FIG. 7, after receiving BUM traffic 46 sourced from end host 16-1 via network 8C and device 10E-1, device 10E-2 may drop BUM traffic 46 to prevent the traffic from reaching at least the leaf-designated local end hosts (as described in connection with FIG. 4). In addition to dropping BUM traffic, device 10E-2 may also broadcast a request message such as request message 58 on interfaces 34 (e.g., all configured local interfaces to which silent hosts can possibly be attached to). Device 10E-2 may broadcast message 58 based on receiving BUM traffic 46, based on dropping BUM traffic 46, and/or otherwise based on other criteria and/or timing (e.g., periodically after receiving BUM traffic 46, etc.).

By broadcasting message 58 on interfaces 34, device 10E-2 may solicit traffic (e.g., in the form of a response message 60 responsive to request message 58) from any silent hosts locally attached to device 10E-2 on these local interfaces. This solicited message 60 when transmitted by silent host 16-2' (e.g., one of hosts 16-2A and 16-2B in FIG.

4) may serve the same purpose as transmitted traffic 48 for non-silent host 16-2 for the purposes of performing the operations of FIG. 5 and subsequently the operations of FIG. 6. Put another way, when a silent host 16-2' is attached to device 10E-2, transmitted traffic from silent host 16-2' (analogous to transmitted traffic 48 in FIG. 5) may include and/or be message 60 solicited by device 10E-2 based on the reception and/or processing of BUM traffic 46 (as described in connection with FIG. 7).

Configurations in which messages 58 and 60 are Reverse Address Resolution Protocol (RARP) messages (e.g., RARP request and response messages, respectively) are sometimes described herein an illustrative example. If desired, other messages that can request or solicit any response from a silent host (e.g., a response that contains the MAC address of the silent host in the response header) may be used.

In the manner described in connection with FIG. 7, even when a network configuration includes one or more silent end hosts, these silent end hosts may each be discoverable and reachability information for each silent end host may be advertised to peer network devices to update the corresponding bridge table with an entry indicating reachability information (e.g., device interface at which the silent host is reachable) and indicating EVPN E-Tree classification information of the silent end host to facilitate network convergence of unicast traffic handling.

Some network configuration (e.g., an illustrative configuration network 8) may exclude silent hosts from one or more VLANs for which EVPN E-Tree service is provided. In these network configurations, the operations described in connection with FIG. 7 (e.g., the egress edge network device soliciting traffic from silent end hosts) may be omitted.

Given that the egress edge network device no longer needs to broadcast a request message when dropping the BUM traffic (e.g., in these network configurations without the silent hosts at least for a particular VLAN), the ingress edge network device may instead drop the BUM traffic. In particular, using the network configuration in FIG. 4 as an example, if none of the locally attached end hosts on the VLAN identified by VLAN-A are silent hosts, ingress edge network device 10E-1 may drop BUM traffic 46 when received from host 16-1. In particular, device 10E-1 may drop BUM traffic 46 by not transmitting BUM traffic 46 into core network 8C. This may help lessen traffic congestion within core network 8C (compared to the configuration in which the egress edge network device(s) drop BUM traffic 46). Even when device 10E-1 drops BUM traffic 46, the operations described in connection with FIGS. 5 and 6 may still occur in time.

Figure 8:
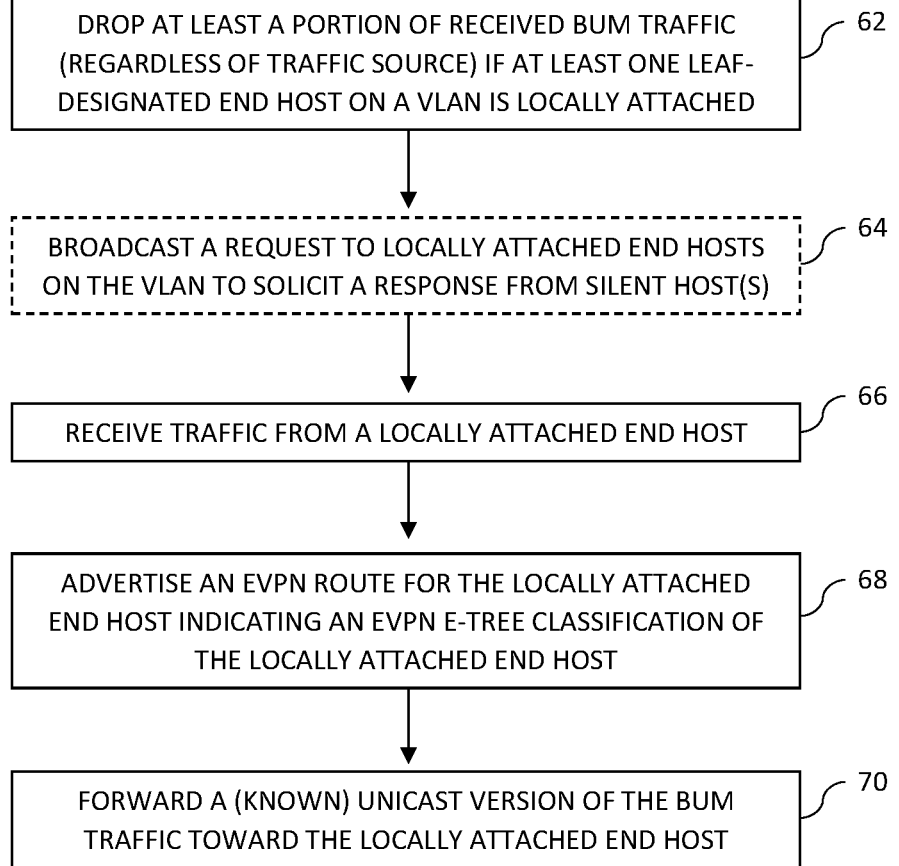
FIG. 8 is a flowchart of illustrative operations for operating an egress edge network device to provide EVPN E-Tree service in accordance with some embodiments.

FIG. 8 is a flowchart of illustrative operations performed by an egress edge network device to provide EVPN E-Tree network segmentation for BUM traffic. These operations in FIG. 8 may be performed using one or more of components of the one or more network devices 10E described in connection with FIG. 1 such as device 10E-2 in FIGS. 4-7. The illustrative operations described in connection with FIG. 8 may generally be performed using processing circuitry (e.g., one or more processors) of control circuitry (e.g., control circuitry 26 in FIG. 2) and/or of packet processor(s) (e.g., packet processor(s) 32 in FIG. 2) on one or more of these network devices 10E (e.g., by executing, on the one or more processors, software instructions stored on memory circuitry on network devices 10E).

At block 62, one or more processors of an egress edge network device (e.g., a network device 10E in FIGS. 1 and 2, an egress edge network device 10E-2 in FIGS. 4-7, etc.) may drop at least a portion of received BUM traffic (regardless of the EVPN E-Tree classification of the traffic source) if at least one leaf-designated end hosts on a VLAN (corresponding to the BUM traffic) is locally attached to the network device. In particular, one or more processors may not be configured to determine EVPN E-Tree classification of the source of the BUM traffic and may prevent the BUM traffic from reaching at least all leaf-designated locally attached end hosts (in case the BUM traffic is leaf-sourced). The one or more processors may still forward the BUM traffic to any root-designated locally attached end hosts, if desired.

At block 64, the one or more processors of the egress edge network device may broadcast a request to locally attached end hosts on the VLAN to solicit a response from any locally attached silent hosts. In particular, in network configurations with possible silent hosts, this type of request may be necessary to induce traffic from locally attached silent hosts to be received by the one or more processors. This may be necessary for the one or more processors to perform the operations at blocks 66-68 even in the presence of silent hosts. In other network configurations, the operations at block 64 may be omitted, if desired.

At block 66, the one or more processors of the egress edge network device may receive local traffic from a locally attached end host. The local traffic may be coincidental (e.g., transmitted by the end host as part of its normal operation) or may be induced (e.g., by the operations at block 64). The one or more processors of the egress edge network device may receive the local traffic at an input-output interface from the locally attached end host and may store a MAC address of the locally attached end host identified in the header of the local traffic and associated with the input-output interface.

At block 68, the one or more processors of the egress edge network device may advertise an EVPN route for the locally attached end host indicating an EVPN E-Tree classification of the locally attached end host. In particular, the EVPN route may be an EVPN Type-2 route for advertising reachability of a remote end host with an E-Tree extended community attached or omitted (e.g., to indicate EVPN E-Tree classification of the remote end host). The advertisement of the EVPN Type-2 route may configure bridge tables for the VLAN stored on peer EVPN devices (e.g., the ingress edge network device).

At block 70, the one or more processors of the egress edge network device may forward a (known) unicast version of the BUM traffic toward the locally attached end host. In particular, the unicast version of the BUM traffic may be first forwarded (e.g., bridged) using a bridge table at the ingress edge network device and subsequently forwarded by the egress edge network device toward the locally attached end host.

FIG. 9 is a flowchart of illustrative operations performed by an ingress edge network device to provide EVPN E-Tree network segmentation for BUM traffic. These operations in FIG. 9 may be performed using one or more of components of the one or more network devices 10E described in connection with FIG. 1 such as device 10E-1 in FIGS. 4-7. The illustrative operations described in connection with FIG. 9 may generally be performed using processing circuitry (e.g., one or more processors) of control circuitry (e.g., control circuitry 26 in FIG. 2) and/or of packet processor(s) (e.g., packet processor(s) 32 in FIG. 2) on one or more of these network devices 10E (e.g., by executing, on the one or more processors, software instructions stored on memory circuitry on network devices 10E).

At block 72, one or more processors of an ingress edge network device (e.g., a network device 10E in FIGS. 1 and 2, an ingress edge network device 10E-1 in FIGS. 4-7, etc.) may drop received BUM traffic (regardless of the EVPN E-Tree classification of the traffic source) in a network configuration without silent hosts. In particular, if the operations described in connection with FIG. 7 can be omitted, the ingress edge network device (instead of the egress edge network device as in the example of FIG. 4) may be configured to perform the dropping of BUM traffic to prevent injecting the BUM traffic into the core network. In network configurations with possible silent end hosts, the operations at block 72 may be omitted.

At block 74, the one or more processors of the ingress edge network device may receive an advertised EVPN route for a remote end host indicating an EVPN E-Tree classification of the remote end host. In particular, the EVPN route received by the ingress edge network device may be the same EVPN route advertised by the egress edge network device at block 68 in FIG. 8.

At block 76, the one or more processors of the ingress edge network device may update a bridge table to facilitate (known) unicast traffic handling. In particular, based on processing the advertised EVPN route, the one or more processors may store, as an entry in the bridge table stored on memory circuitry (e.g., memory circuitry 30 of the ingress edge network device), reachability of a remote end host attached locally to the advertising egress edge network device as well as the EVPN E-Tree classification of the remote end host. Configured in this manner, the ingress edge network device may be configured to perform ingress filtering for known unicast traffic.

At block 78, the one or more processors of the ingress edge network device may forward a (known) unicast version of the BUM traffic toward the remote end host. In particular, as described in connection with block 70 in FIG. 8, the ingress edge network device may transmit the known unicast traffic (e.g., the known unicast version of the BUM traffic) to the egress edge network device through the core network before the egress edge network device further forwards the known unicast traffic toward the remote end host.

The methods and operations described above in connection with FIGS. 1-9 may be performed by the components of the network device(s) and/or server or other computing equipment (e.g., network devices 10E) using software, firmware, and/or hardware (e.g., dedicated circuitry or hardware). Software code for performing these operations may be stored on non-transitory computer-readable storage media (e.g., tangible computer-readable storage media) stored on one or more of the components of the network device(s) and/or server or other computing equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other computing equipment (e.g., processing circuitry 28 in FIG. 2, packet processor(s) 32 in FIG. 2, etc.).

The foregoing is merely illustrative and various modifications can be made to the described embodiments. The foregoing embodiments may be implemented individually or in any combination.

15

16

What is claimed is:

1. A method of conveying network traffic to provide Ethernet Virtual Private Network (EVPN) Ethernet-Tree (E-Tree) service, the method comprising:

receiving broadcast, unknown unicast, or multicast (BUM) traffic sourced from a root-designated end host in a Virtual Local Area Network (VLAN);

dropping the BUM traffic to prevent forwarding of the BUM traffic toward at least a leaf-designated end host in the VLAN;

after dropping the BUM traffic, configuring a bridge table to include an entry associated with the leaf-designated end host; and after configuring the bridge table, forwarding a known unicast version of the BUM traffic sourced from the root-designated end host and destined for the leaf-designated end host.

2. The method defined in claim 1, wherein receiving the BUM traffic comprises receiving, by an egress edge network device to which the leaf-designated end host is locally attached, the BUM traffic, dropping the BUM traffic comprises, dropping, by the egress edge network device, the BUM traffic, configuring the bridge table comprises advertising, by the egress edge network device, an EVPN route based on which the bridge table is configured, the EVPN route includes an address of the leaf-designated end host and indicates a leaf classification of the leaf-designated end host, and forwarding the known unicast version of the BUM traffic comprises forwarding, by the egress edge network device, the known unicast version of the BUM traffic.

3. The method defined in claim 2 further comprising:

receiving, by the egress edge network device and at an interface of the egress edge network device, network traffic sourced from the leaf-designated end host, wherein the network traffic identifies the address of the leaf-designated end host and wherein advertising, by the egress edge network device, the EVPN route is based on an association between the address of the leaf-designated end host and the interface of the egress edge network device.

4. The method defined in claim 3 further comprising:

requesting, by the egress edge network device, the network traffic from the leaf-designated end host.

5. The method defined in claim 4, wherein requesting, by the egress edge network device, the network traffic from the leaf-designated end host is based on receiving, by the egress edge network device, the BUM traffic.

6. The method defined in claim 5, wherein requesting, by the egress edge network device, the network traffic from the leaf-designated end host comprises sending, by the egress edge network device, a broadcast Reverse Address Resolution Protocol request toward the leaf-designated end host to solicit a response from the leaf-designated end host.

7. The method defined in claim 2, wherein a peer ingress edge network device is locally attached to the root-designated end host, wherein the peer ingress edge network device stores the bridge table, and wherein the known unicast version of the BUM traffic is processed by the peer ingress edge network device based on the entry in the bridge table.

8. The method defined in claim 7, wherein the EVPN route comprises an EVPN Type-2 route that includes an E-Tree extended community with leaf-indication information.

9. The method defined in claim 1, wherein receiving the BUM traffic comprises receiving, by an ingress edge network device to which the root-designated end host is locally attached, the BUM traffic, dropping the BUM traffic comprises, dropping, by the ingress edge network device, the BUM traffic, configuring the bridge table comprises updating, by the ingress edge network device, the bridge table to include the entry based on a received EVPN route, the received EVPN route includes an address of the leaf-designated end host and indicates a leaf classification of the leaf-designated end host, the bridge table is stored at the ingress edge network device, and forwarding the known unicast version of the BUM traffic comprises forwarding, by the ingress edge network device, the known unicast version of the BUM traffic.

10. The method defined in claim 9, wherein all end hosts in the VLAN that are locally attached to any peer egress edge network devices are non-silent end hosts.

11. A network device configured as an egress edge network device and configured to provide Ethernet Virtual Private Network (EVPN) Ethernet-Tree (E-Tree) service, the network device comprising:

memory circuitry; and one or more processors coupled to the memory circuitry and configured to:

receive, from an ingress edge network device, broadcast, unknown unicast, or multicast (BUM) traffic sourced from a root-designated end host in a Virtual Local Area Network (VLAN);

drop the BUM traffic to prevent forwarding of the BUM traffic toward at least a leaf-designated end host in the VLAN;

configure a bridge table on the ingress edge network device to include an entry associated with the leaf-designated end host;

receive, from the ingress edge network device, a known unicast version of the BUM traffic sourced from the root-designated end host and destined for the leaf-designated end host; and forward the received known unicast version of the BUM traffic.

12. The network device defined in claim 11, wherein the leaf-designated end host is locally attached to the network device.

13. The network device defined in claim 11, wherein the one or more processors are configured to configure the bridge table on the ingress edge network device by advertising an EVPN route based on which the bridge table is configured.

14. The network device defined in claim 13, wherein the EVPN route includes an address of the leaf-designated end host and indicates a leaf classification of the leaf-designated end host.

15. The network device defined in claim 13 further comprising an input-output interface, wherein the one or more processors are configured to receive, at the input-output interface, network traffic sourced from the leaf-designated end host, wherein the network traffic identifies an address of the leaf-designated end host, and wherein the EVPN route is advertised based on an association between the address of the leaf-designated end host and the input-output interface.

16. The network device defined in claim 15, wherein the one or more processors are configured to solicit the network traffic from the leaf-designated end host.

17. The network device defined in claim 16, wherein the one or more processors are configured to solicit the network traffic from the leaf-designated end host by sending a broadcast Reverse Address Resolution Protocol request toward the leaf-designated end host to solicit a response from the leaf-designated end host.

18. The network device defined in claim 11, wherein the root-designated end host is locally attached to the ingress edge network device and wherein the known unicast version of the BUM traffic is processed by the ingress edge network device based on the entry in the bridge table.

19. A network device configured as an ingress edge network device and configured to provide Ethernet Virtual Private Network (EVPN) Ethernet-Tree (E-Tree) service, the network device comprising:

memory circuitry; and one or more processors coupled to the memory circuitry and configured to:

receive broadcast, unknown unicast, or multicast (BUM) traffic sourced from a root-designated end host in a Virtual Local Area Network (VLAN);

drop the BUM traffic to prevent forwarding of the BUM traffic toward at least a leaf-designated end host in the VLAN;

configure a bridge table on the memory circuitry to include an entry associated with the leaf-designated end host; and forward a known unicast version of the BUM traffic toward an egress edge network device based on the entry associated with the leaf-designated end host, wherein the known unicast version of the BUM traffic is sourced from the root-designated end host and destined for the leaf-designated end host.

20. The network device defined in claim 19, wherein the one or more processors are configured to receive, from the egress edge network device, an EVPN route and wherein the bridge table is configured based on the received EVPN route.

* * * * *